(12) United States Patent
Beckman

(10) Patent No.: US 9,140,599 B1
(45) Date of Patent: Sep. 22, 2015

(54) SYSTEMS AND METHODS FOR COMMUNICATING BETWEEN DEVICES USING VIBRATIONS

(71) Applicant: Amazon Technologies, Inc., Reno, NV (US)

(72) Inventor: Peter C. Beckman, Falls Church, VA (US)

(73) Assignee: Amazon Technologies, Inc., Reno, NV (US)

( * ) Notice: Subject to any disclaimer, the term of this patent is extended or adjusted under 35 U.S.C. 154(b) by 192 days.

(21) Appl. No.: 13/667,858

(22) Filed: Nov. 2, 2012

(51) Int. Cl.
*G01H 1/00* (2006.01)
*H04W 12/06* (2009.01)
*H04W 4/00* (2009.01)

(52) U.S. Cl.
CPC .................. *G01H 1/003* (2013.01); *G01H 1/00* (2013.01); *H04W 4/008* (2013.01); *H04W 12/06* (2013.01)

(58) Field of Classification Search
CPC ..... H04W 12/06; H04W 4/008; G01H 1/003; G01H 1/00
USPC ....................... 455/41.1, 41.2, 41.3
See application file for complete search history.

(56) References Cited

U.S. PATENT DOCUMENTS

| | | | |
|---|---|---|---|
| 2001/0042403 A1* | 11/2001 | Watson ........................ | 73/504.02 |
| 2004/0043677 A1* | 3/2004 | Yamamoto et al. ............. | 440/15 |
| 2004/0056840 A1* | 3/2004 | Goldenberg et al. .......... | 345/156 |
| 2004/0137858 A1* | 7/2004 | Corse et al. .................... | 455/102 |
| 2004/0185915 A1* | 9/2004 | Ihara et al. .................... | 455/569.1 |
| 2005/0093868 A1* | 5/2005 | Hinckley ........................ | 345/502 |
| 2005/0219206 A1* | 10/2005 | Schena et al. ................. | 345/156 |
| 2006/0151613 A1* | 7/2006 | Zmood .......................... | 235/492 |
| 2006/0290662 A1* | 12/2006 | Houston et al. ................ | 345/156 |
| 2007/0188323 A1* | 8/2007 | Sinclair et al. ................. | 340/568.1 |
| 2008/0239594 A1* | 10/2008 | Shimazaki et al. ............. | 361/23 |
| 2008/0296373 A1* | 12/2008 | Zmood et al. .................. | 235/385 |
| 2009/0176505 A1* | 7/2009 | Van Deventer et al. ..... | 455/456.1 |
| 2010/0033422 A1* | 2/2010 | Mucignat et al. .............. | 345/156 |
| 2011/0199188 A1* | 8/2011 | Dickson ......................... | 340/10.1 |
| 2011/0248817 A1* | 10/2011 | Houston et al. ................ | 340/4.2 |
| 2012/0028710 A1* | 2/2012 | Furukawa et al. .............. | 463/37 |
| 2012/0190299 A1* | 7/2012 | Takatsuka et al. ............ | 455/41.1 |
| 2013/0171935 A1* | 7/2013 | Tsai et al. ...................... | 455/41.2 |
| 2013/0237155 A1* | 9/2013 | Kim .............................. | 455/41.2 |

* cited by examiner

*Primary Examiner* — Bobbak Safaipour
*Assistant Examiner* — Devan Sandiford
(74) *Attorney, Agent, or Firm* — Sutherland Asbill & Brennan LLP

(57) ABSTRACT

This disclosure relates to systems and methods for sending and receiving messages between two user devices using vibration generation and detection techniques. The devices may be placed in proximity to each other and initiate a solicitation protocol and a communication protocol routine to establish a vibration communication link. The devices may exchange information using information that is encoded into the vibrations that are transferred from one user device to another user device.

17 Claims, 6 Drawing Sheets

SYSTEMS AND METHODS FOR COMMUNICATING BETWEEN DEVICES USING VIBRATIONS

BACKGROUND

Peer-to-peer communications are increasingly popular among users of electronic devices. Security for peer-to-peer communications enables two or more users to engage in protected conversations. However, exchanging security credentials over a wireless connection is susceptible to eavesdropping and may compromise security when an eavesdropper successfully intercepts the security credentials without being noticed. Security precautions that may prevent eavesdropping would be advantageous to peer-to-peer communication users.

Figure 1:
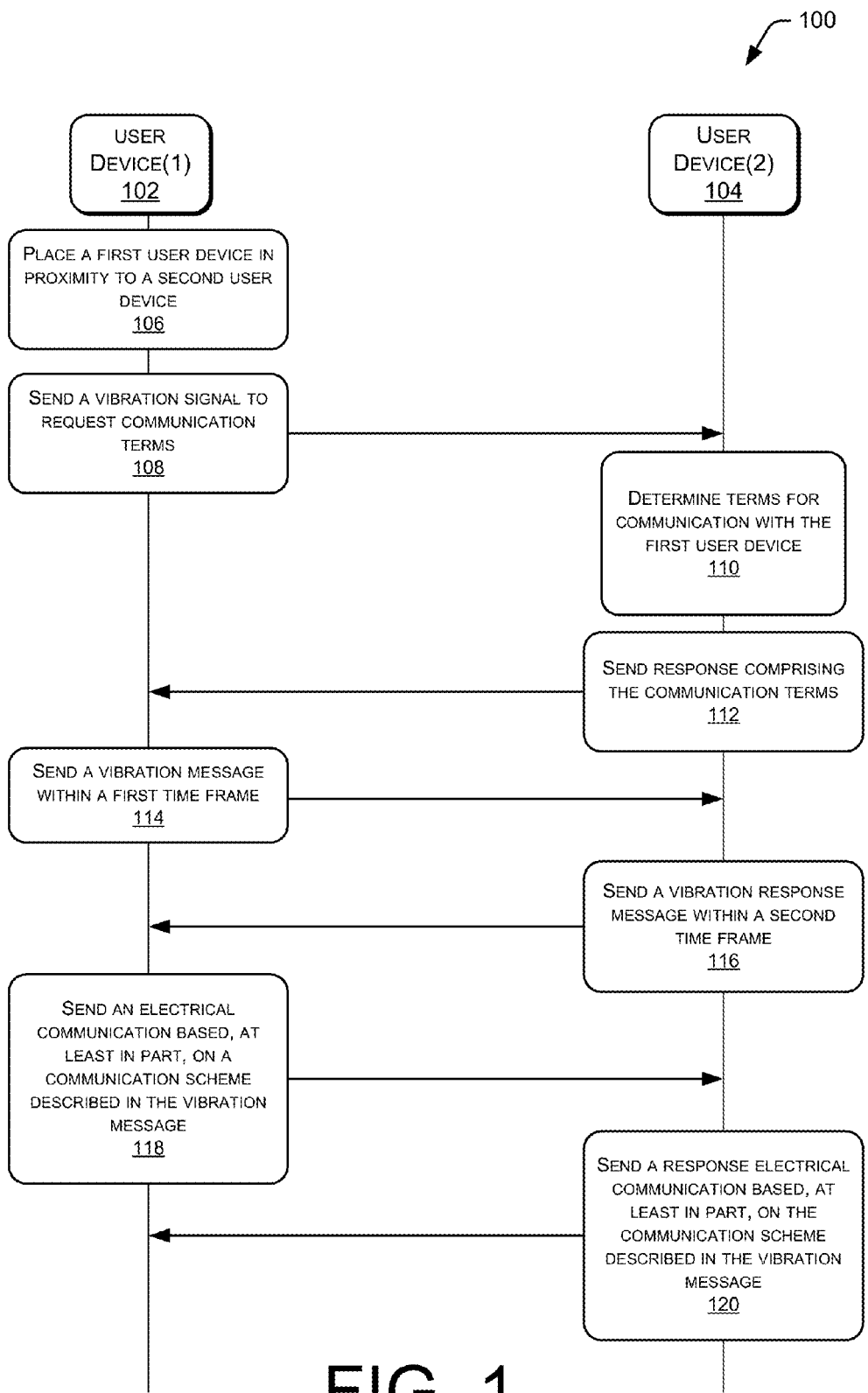
FIG. 1 illustrates a flow diagram for a method for sending and receiving vibration signals between two user devices in accordance with one or more embodiments of the disclosure.

Certain implementations will now be described more fully below with reference to the accompanying drawings in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for sending information using a vibration device and receiving information using a vibration detection device. User devices may include a vibration device that may oscillate between two or more vibration frequencies to encode information. Another user device may detect the vibration frequencies (using a vibration detection device) and decode the information based, at least in part, on the arrangement of the two or more vibration frequencies. The vibration device and the vibration detection device may enable user devices to send and receive low bandwidth communications with other nearby user devices.

In one embodiment, two user devices may be placed in contact with each other prior to generating vibrations or detecting vibrations. A first user device may be placed on top of a second user device to facilitate vibration communication. The first user device may send a vibration negotiation message that may invite the second user device to communicate using its vibration device and vibration detection device. The negotiation message may include an arrangement of one or more frequencies for a limited period of time. The first user device may pause vibrating when a limited period of time has elapsed to listen for a response to the negotiation message. The second user device may have detected the negotiation message and may vibrate an acknowledgement message comprising at least one frequency for a limited period of time.

Upon receiving the acknowledgement message, the first user device may vibrate a protocol message comprising at least two vibration frequencies. The protocol message may include two or more frequencies that encode a message describing the frequencies and speed of oscillation between the frequencies that the first user device may use to communicate with the second user device. For example, the first user device may select 1000 Hz and 2000 Hz to encode messages using a binary technique. The first user device may oscillate between 1000 Hz and 2000 Hz within one revolution of the vibration device to encode a message using the binary technique. Accordingly, the first user device may vibrate constantly at 1000 Hz to signify "zero" and may peak at 2000 Hz to signify a "one" during a first time interval. The second user device may decode the vibrations to determine what information has been sent from the first user device. The second user device may respond to the message using a similar vibration encoding technique from the first user device during a second time interval when the first user device is listening for a response. The first user device and the second user device may alternate between sending and receiving time periods to communicate information encoded within the vibrations of each user device.

In one embodiment, the first user device may encode communication protocols within an arrangement of vibration frequencies. The communication protocols may include information that the first user device may use to enable wireless or wired electrical communication with the second user device. For example, the communication protocols may include an encryption key that may be used to secure an electrical communication between the first user device and the second user device. In another instance, the communication protocols may indicate what type of communication system (such as peer-to-peer, a wireless network with access points, and /or a wired network connection) should be used to communicate with the devices. The communication protocols may also include when and/or in what location the communication may take place.

In another embodiment, the vibration encoded information exchange may be part of a user authentication scheme. For example, the communication protocols may also include a call and response communication authentication scheme between the first and second user devices. The first user device may send a question to the user of the second user device and wait for a response that may validate the identity of the user of the second user device. When answered correctly, the second user device may enable the first user to access a secure area. In one instance, the secure area may include the second user device. The user may be given access to the second user device which may include access to a secure network of other user devices. In another instance, the secure area access may include providing access (e.g., unlocking a door) to a secure area or unlocking a compartment that secures restricted information or content.

In another embodiment, the vibration encoded information may include instructions for the user to follow to gain access to information. For example, the information may include an internet protocol address or a website address. The information may also include authentication information (e.g., username or password) to access information at the internet protocol address or website. The encoded information may include instructions on when and/or where to access the internet protocol address. For example, the user may be directed to use a certain type of network (e.g., wired connection) or a specific device to access the internet protocol address. The user may also be directed to access the internet protocol address at a certain time or date. The time/date options may include: before a certain time/date, at a certain time/date, or after a certain time/date.

Illustrative System

FIG. 1 illustrates a flow diagram for a method 100 that illustrates one embodiment of exchanging vibration encoded information between a user device(1) 102 and another user device(2) 104. The method 100 may begin near the top of the flow diagram and may proceed downward towards the bottom of the flow diagram. The relative position of the flow diagram blocks may indicate the sequence of the method 100. The blocks closer to the top of the flow diagram may indicate that they are performed or executed before the blocks below them. It should be noted that in other embodiments the sequencing of the flow diagram 100 may be altered and some operations may be omitted.

At block 106, the user device(1) 102 may be placed in proximity to the other user device(2) 104. The proximity of the devices may be based, at least in part, on the capability of each device to detect vibrations from each other with enough clarity to be able to decipher the frequency and duration of the vibrations.

In one embodiment, the user device(1) 102 may be placed on top of the user device(2) 104. The user devices 102, 104 may or may not be enclosed within protective shells that minimize scratches or impact damage to the user devices 102, 104. Vibrations from the user devices 102, 104 may be transmitted through the direct contact between the two devices 102, 104. In this arrangement, the display screen for the top device (e.g., user device(1) 102) may be visible in this arrangement. The user may interface with the top user device to initiate the vibration communication. In certain instances, the display screen may display the status of the vibration communication or the type of information that may be requested during the vibration communication. In one specific embodiment, the top device may request that the user enter information to verify his or her identity.

In another embodiment, the user device(1) 102 may be placed adjacent to the other user device(2) 104 while maintaining physical contact between the two user devices 102, 104. In this embodiment, the display screens for each of the user devices 102, 104 may be visible in this arrangement. The display screens may display the status of the vibration communication. In another instance, the user of user device(2) 102 or the user of user device(1) 104 may prompt or initiate the vibration communication.

In another embodiment, the user device(1) 102 may be placed near (but not in direct physical contact with) the user device(2) 104. The user devices 102, 104 may be separated by and/or connected to one or more common objects that may operate as a conduit for vibrations between the two user devices 102, 104. The common object may be of sufficient hardness to transfer vibrations between the two user devices 102, 104, such that each device 102, 104 may determine the vibration frequencies and the changes between the vibration frequencies.

At block 108, the user device(1) 102 may begin vibrating at one or more frequencies in an arrangement intended to request another user device(2) 104 to engage in vibration communications. In one embodiment, the vibration request may be periodically or intermittently repeated followed by a pause to listen for a response to the request.

In one embodiment, the request message may include a simple message that is indicating that the user device(1) 102 is available to communicate using vibrations. This request may be encoded into a single frequency vibration that alternates between vibrating and not vibrating at that frequency. In another instance, the request may include two or more vibration frequencies that are arranged together to communicate the availability of the user device(1) 102 to communicate using vibrations.

In another embodiment, the request message may be more complex and include communication terms that may include the frequencies that are used to encode messages and the speed in which the user device(1) 102 may switch between the frequencies to represent a "zero" or a "one" for binary encoding. The frequency terms may be within the capability of the user device(1) 102; however, other user devices (e.g., user device(2) 104) may not be capable of generating those vibration frequencies nor be able to process the change between frequencies as fast as the user device(1) 102. For example, the user device(1) 102 may use 1000 Hz and 2000 Hz to encode messages and may switch between the two frequencies within one revolution of a motor that is generating the vibrations. However, the other user device may only be able to determine shifts in frequency within five revolutions of the motor. Accordingly, the user device(1) 102 may encode messages that account for the capabilities of the other user device. Hence, the change in frequency used during the encoding process may occur within no shorter than five revolutions of the motor.

At block 110, the user device(2) 104 may detect the vibrations from the user device(1) 102 and determine how to respond to the message encoded within the vibrations. In this embodiment, the encoded message may be requesting communication terms or approval of communication terms that are encoded into the message. The user device(2) 104 may determine whether the communication terms are acceptable based on its vibration generation and detection capabilities. In this embodiment, the user device(2) 104 may prefer to use the 1000 Hz and 2000 Hz frequencies and use the one revolution speed to change between the frequencies.

At block 112, the user device(2) 104 may send the encoded communication terms to the user device(1) 102 using a vibration generation device. The types of vibration generation and detection techniques will be discussed in greater detail in the discussion of FIG. 2. In this embodiment, the user device(2) 104 may wait for a predetermined amount of time or wait for the user device(1) 102 to pause vibrations before sending the encoded communication terms. The terms may also include a time period or duration in which the user device(2) 104 may send vibrations to or receive vibrations from the user device (1) 102.

At block 114, the user device(1) 102 may detect the vibrations from the user device and may initiate the vibration communication based, at least in part, on the communication terms agreed to by the user devices 102, 104. The user device (1) 102 may send an encoded vibration message to the user device(2) 104 within the first time frame specified within the communication terms. In one embodiment, the encoded message may include a communication scheme for an electrical communication protocol that may enable or facilitate electrical communications between the user devices 102, 104. In one specific embodiment, the communication protocol may include an encryption key to secure electrical communications between the user devices 102, 104.

At block 116, the user device(2) 104 may receive the encoded vibration message from the user device(1) 102. The user device(2) 104 may decode the message, determine a response message, and encode the response message. The response message may be encoded based, at least in part, on the previously agreed upon communication terms. The user device(2) 104 may generate a vibration signal or signature that is based, at least in part, on an encoded response message. In one embodiment, the encoded response message may be an acknowledgment of receipt for the communication protocol or a recommendation to use another communication protocol.

At block 118, the user device(1) 102 may send an electrical communication using a wireless or wired connection to the other user device(2) 104. In one embodiment, the electrical communication may have been enabled or initiated as a result of the information exchanged during the vibration communication between the user devices 102, 104. For instance, the electrical communication may have included the type or method of electrical communication such as: a wireless communication using an access point network, a wired communication, or a peer-to-peer communication. In another instance, the electrical communication may have included an encryption key that may be used to encrypt or decrypt the electrical communication between the devices 102, 104. In one specific embodiment, the user device(1) 102 may have encrypted the electrical communication and sent the encrypted information over a wireless network to the other user device(2) 104.

At block 120, the user device(2) 104 may acknowledge the receipt of the electrical communication and send a response. In one specific embodiment, the user device(2) 104 may decrypt the received information and send an encrypted response that the information was received and decrypted properly.

In another embodiment, the electrical communication portion of the method 100 may be omitted. The user devices 102, 104 may continue to communicate using the vibration techniques described above and/or below to exchange information on an as needed basis.

Figure 2:
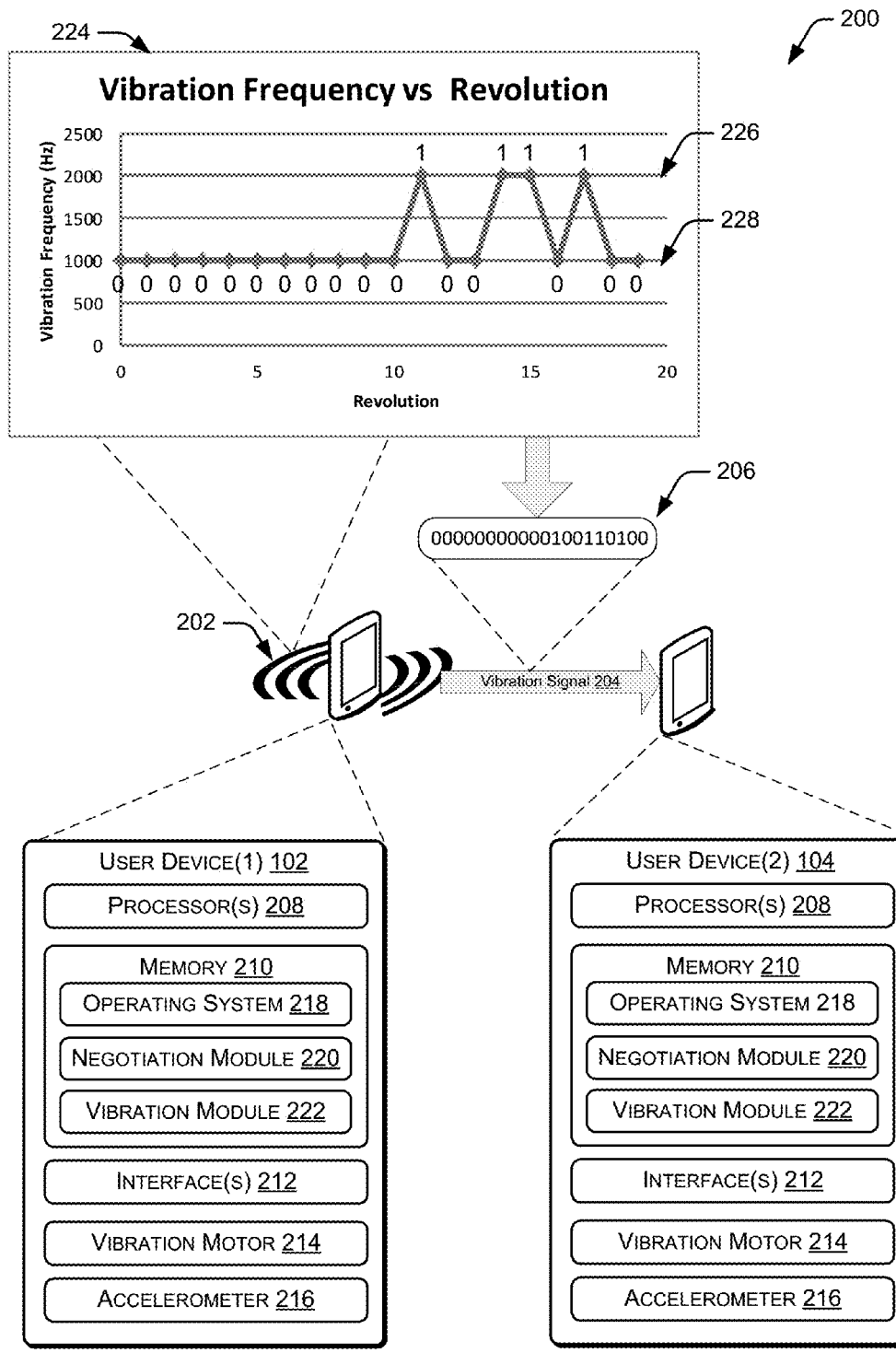
FIG. 2 illustrates a system for sending and receiving vibration signals between two user devices in accordance with one or more embodiments of the disclosure.

FIG. 2 illustrates a system 200 for communicating between two user devices 102, 104 using vibration generation and detection techniques. In this embodiment, the user device(1) 102 may send a vibration 202 between at least two frequencies to encode a message that is detected by the other user device(2) 104. The vibration signal 204 may be configured to communicate using a binary technique that may be based on at least two vibrating frequencies. The encoded vibration may represent a binary value 206 that may be used to exchange information between the user devices 102, 104 as described above in the description of FIG. 1.

In this embodiment, the user devices 102, 104 may be configured similarly with respect to hardware, software, and/or any combination thereof. However, in other embodiments, the user devices 102, 104 may not share a similar configuration. With regard to the description of the user devices 102, 104, the same terms may be used to describe the features, functions, and capabilities of the user devices 102, 104 just by referencing user device 102 or user device(1) 102. However, the features, functions, and capabilities described for user device(1) 102 may also apply to user device(2) 104.

The user device 102 may include one or more computer processors 208, a memory 210, one or more interfaces 212, a vibration motor 214, and an accelerometer 216.

The computer processors 208 may comprise one or more cores and are configured to access and execute (at least in part) computer-readable instructions stored in the one or more memories 210. The one or more computer processors 208 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 208 and one or more of the other components of the user device 102. In certain embodiments, the user device 102 may be based on an Intel® architecture or an ARMO architecture and the processor(s) 208 and chipset may be from a family of Intel® processors and chipsets. The one or more processors 208 may also include one or more application-specific integrated circuits (ASICs) or application-specific standard products (ASSPs) for handling specific data processing functions or tasks.

The interfaces 212 may also comprise one or more communication interfaces or network interface devices to provide for the transfer of data between the user device 102 and another device directly such as in a peer-to-peer fashion, via an electrical network (not shown), or both. The communication interfaces may include, but are not limited to: personal area networks ("PANs"), wired local area networks ("LANs"), wireless local area networks ("WLANs"), wireless wide area networks ("WWANs"), and so forth. The wireless system interfaces may include the hardware and software to broadcast and receive messages either using the Wi-Fi Direct Standard (See Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the user device(1) 102 and another device such as an access point, a host computer, a server, a router, a reader device, another user device(2) 104, and the like. The network may include, but is not limited to: the Internet, a private network, a virtual private network, a wireless wide area network, a local area network, a metropolitan area network, a telephone network, and so forth.

The vibration motor 214 may be any vibration generation device that may be triggered and controlled electrically by the user device 102. In one embodiment, the vibration motor may include a rotational motor that includes a rotating shaft. An unbalanced mass may be coupled to the rotating shaft and may generate vibrations as the shaft is rotated by the rotational motor. The unbalanced mass may include an object that has a center of gravity that is off-center from the rotational motor. In this way, as the motor rotates, a physical motion or vibration may be generated as the unbalanced mass is rotated around in a circular manner. The vibration motor 214 may control the vibration to specific frequency (e.g., 1000 Hz). The vibration motor 214 may also increase or decrease the frequency of the vibration. For example, the vibration motor 214 may oscillate between two or more frequencies to generate the vibration signal 204. The vibration motor 214 may control the speed of oscillation between the two or more frequencies. In one embodiment, the vibration may switch between the two frequencies based on the number of revolutions of the motor shaft. The oscillation may occur within one or more revolutions of the motor shaft. In one specific embodiment, the change between 1000 Hz and 2000 Hz vibrations may occur within one revolution of the rotating shaft. In another specific embodiment, the change between 1000 Hz and 2000 Hz vibrations may occur within one revolution of the rotating shaft or within two or more revolutions (e.g., five revolutions). The number of revolutions needed to oscillate between the frequency values may be determined during the negotiation process described above in the description of FIG. 1.

The vibration frequency versus revolution chart 224 illustrates the frequency of the vibration as it changes over time (e.g., revolutions) between the zero frequency 228 (e.g., 1000 Hz) and the one frequency 226 (e.g., 2000 Hz). When the vibration motor 214 vibrates at the zero frequency for one or more revolutions, that may be considered a zero on the binary scale. In this embodiment, each revolution is an indication of a binary value. For each revolution at the one frequency, that may be considered a one on the binary scale as illustrated in the vibration frequency versus revolution chart 224. For example, revolutions 1-11, 13, 14, 17, 19, and 20 are zeros and revolutions 12, 15, 16, and 18 are ones.

The accelerometer 216 may be any vibration detection device that may be electronically controlled and/or monitored. The accelerometer 216 may be an electromechanical device that measures acceleration forces in one or more directions. When the user device 102 vibrates, the accelerometer 216 may measure the movement and determine the frequency of the movement as the user device 102 moves back and forth (i.e., vibrates). The accelerometer may also determine the amount of time the vibrations take to oscillate between two different frequencies. For example, the accelerometer 216 may be able to determine the vibration information represented in the vibration frequency versus revolution chart 224.

The one or more memories 210 comprise one or more computer-readable storage media ("CRSM"). In some embodiments, the one or more memories 210 may include non-transitory media such as random access memory ("RAM"), flash RAM, magnetic media, optical media, solid state media, and so forth. The one or more memories 210 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 210 may store an operating system 218 that includes a plurality of computer-executable instructions that may be implemented by the processor 208 to perform a variety of tasks to operate the interface(s) 212 and any other hardware installed on the user device 102. The memory 210 may also include: a negotiation module 220 and a vibration module 222.

The negotiation module 220 may direct the initiation of vibration communications between the user devices 102, 104. Protocols for soliciting vibration communications from other devices may be managed by the negotiation module 220. A solicitation protocol may include vibration arrangements (or signals) that indicate the user device 102 is available to communicate using vibrations. For example, the solicitation vibration arrangement may include vibrating at one or more frequencies for a predetermined amount of time and then listening or waiting for a response to the solicitation. In one specific embodiment, the solicitation vibration arrangement may include vibrating at three different frequencies in a successive manner over a three second period and then pausing for at least three seconds before repeating the three frequency arrangement. When the solicitation vibration arrangement receives a response, the negotiation module 220 may be a communication terms protocol.

Broadly, the communication terms protocol may be the way in which the user devices agree on the technical aspects of using vibrations to communicate with each other. In general, this may include determining the capabilities of the user devices 102, 104 to generate or detect vibrations. In one embodiment, the communication terms protocol may establish the encoding techniques (e.g., 5-bits, binary-coded decimal, ASCII,) for information transfer, the vibration frequencies to be used for information transfer, the speed or time to oscillate between the frequencies, and/or the duration of time each user device 102 will have to generate vibrations or to listen for vibrations. The communication terms protocol may enable the user devices 102, 104 to indicate which terms they are capable of performing or processing and allowing them to agree on which terms may be used to communicate using vibrations. This may include an iterative process that governs the exchange of preferences and allows the selection of the terms that enable vibration communications. For example, the user device 102 may indicate that: the vibration information will be encoded using ASCII, the vibration frequency for zero is 1000 Hz, the vibration frequency for one is 2000 Hz, the frequency shift may occur over one revolution of the motor, the user device 102 will generate vibrations for five seconds, and then listen for vibrations for the next five seconds to capture a response from the other user device 104. The other user device 104 may agree to the terms, but may recommend that the frequency shift occurs over five revolutions instead of one revolution. The user device 102 may agree to the five revolution condition and may initiate the information exchange.

If the user devices 102, 104 are not capable of agreeing on terms, the negotiation module 220 may inform the user that vibration communication may not be available. This may be due to the mismatch in vibration technology that may not enable the user devices 102, 104 to comprehend the vibrations being generated by each other.

The vibration module 222 may encode the information that the user device 102 will send using the vibration motor 214 and decode the vibration information that the accelerometer 216 receives from the other user device 104. The negotiation module 220 may send the communication terms to the vibration module 222. The vibration module 222 may determine the type and timing of the information to send to the other user device 104. For example, an encryption key and a request to use the encryption key with an electrical communication system may be encoded and sent to the other user device. The vibration module 222 may receive an acknowledgment of receiving the encryption key and a confirmation regarding the use of the electrical communication system. In other instances, the vibration module 222 may encode any other information that a user may want to send to another user. The vibration module 222 may also send a request to change the communication terms when needed. For example, when a large of amount of information needs to be exchanged, the vibration module 222 may request additional time to send the information instead of using the previously agreed upon time window to generate a vibration signal.

Figure 3:
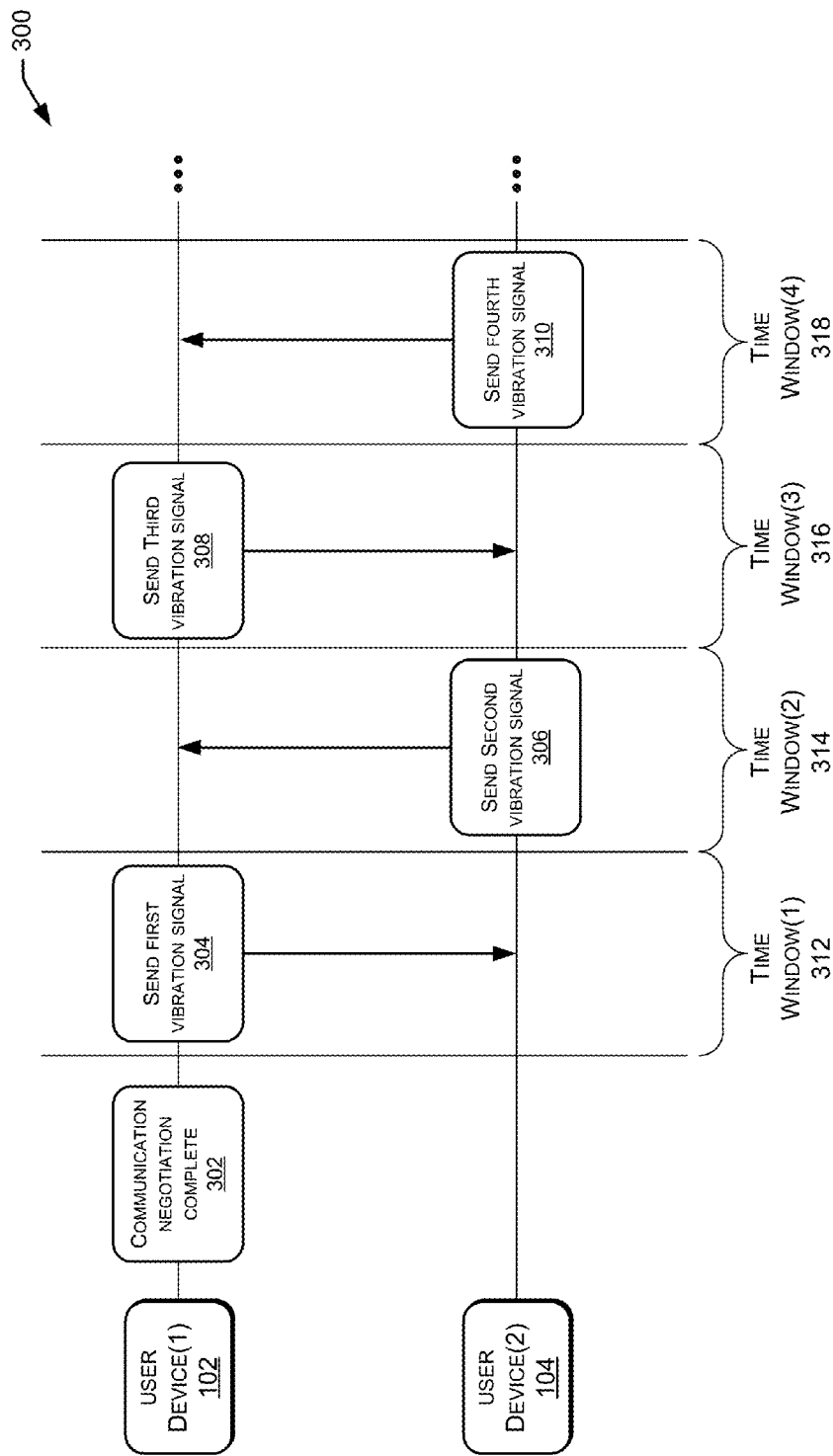
FIG. 3 illustrates a flow diagram for a method for sending and receiving vibration signals between two user devices using communication time windows in accordance with one or more embodiments of the disclosure.

FIG. 3 illustrates a flow diagram for a method 300 that illustrates one embodiment of exchanging vibration encoded information between a user device(1) 102 and another user device(2) 104 during designated time windows. The method 300 may begin near the left side of the flow diagram and may proceed to the right side of the flow diagram. The relative position of the flow diagram blocks may indicate the sequence of the method 300. The blocks closer to the left side of the flow diagram may indicate that they are performed or executed before the blocks on the right side. It should be noted that in other embodiments the sequencing of the flow diagram 300 may be altered and some operations may be omitted.

At block 302, the user device(1) 102 may have completed the negotiation process of soliciting and agreeing to communication terms with another user device(2) 104. One of the terms may have been agreeing to the time windows of communication. For example, the user devices 102, 104 may have agreed to five second time windows alternating between generating vibrations and detecting vibrations.

At block 304, the user device(1) 102 may generate and send an encoded vibration signal or arrangement to the other user device(2) 104 during time window(1) 312. During this time, the user device(2) 104 may not be generating vibrations, but rather, detecting vibrations using the accelerometer 216. The user device(1) 102 may allow all or a portion of the time window(1) 312 to generate vibrations. The time windows may not require the user devices 102, 104 to generate vibrations for the entire time span. During this time, the user device(2) 104 may also be processing the encoded vibrations and determining a response encoded vibration signal. In one specific embodiment, the encoded vibration may include a query to the other user device (1) 102 about its network capabilities (e.g., wired or wireless).

At block 306, the user device(2) 104 may generate and send an encoded vibration signal or arrangement to the other user device(1) 102 during a time window(2) 314. During this time, the other user device(1) 102 may not be generating vibrations, but rather, detecting vibrations using the accelerometer 216. In this specific embodiment, the user device(2) 104 may inform the other user device(1) 102 of the wireless capabilities and/or any relevant network information.

At block 308, the user device(1) 102 may generate and send an encoded vibration signal or arrangement to the other user device(2) 104 during time window(3) 316. In this specific embodiment, the communication may include a request to use an electrical communication system (e.g., the wireless system described in block 306) and an encryption key to secure the information exchanged over the communication system.

At block 310, the user device(2) 104 may generate and send an encoded vibration signal or arrangement to the other user device(1) 102 during time window(4) 318. In this specific embodiment, the user device(2) 104 may confirm the receipt of the encryption key and acknowledge the request to use the electrical communication system. In this instance, the user device(1) 102 or the user device(2) 104 may initiate its electrical communication system, encrypt its information, and exchange encrypted information over the electrical communication system.

In another embodiment, the exchange of information may continue using additional time windows that allow each of the user devices 102, 104 to send and receive vibration communications as needed.

Figure 4:
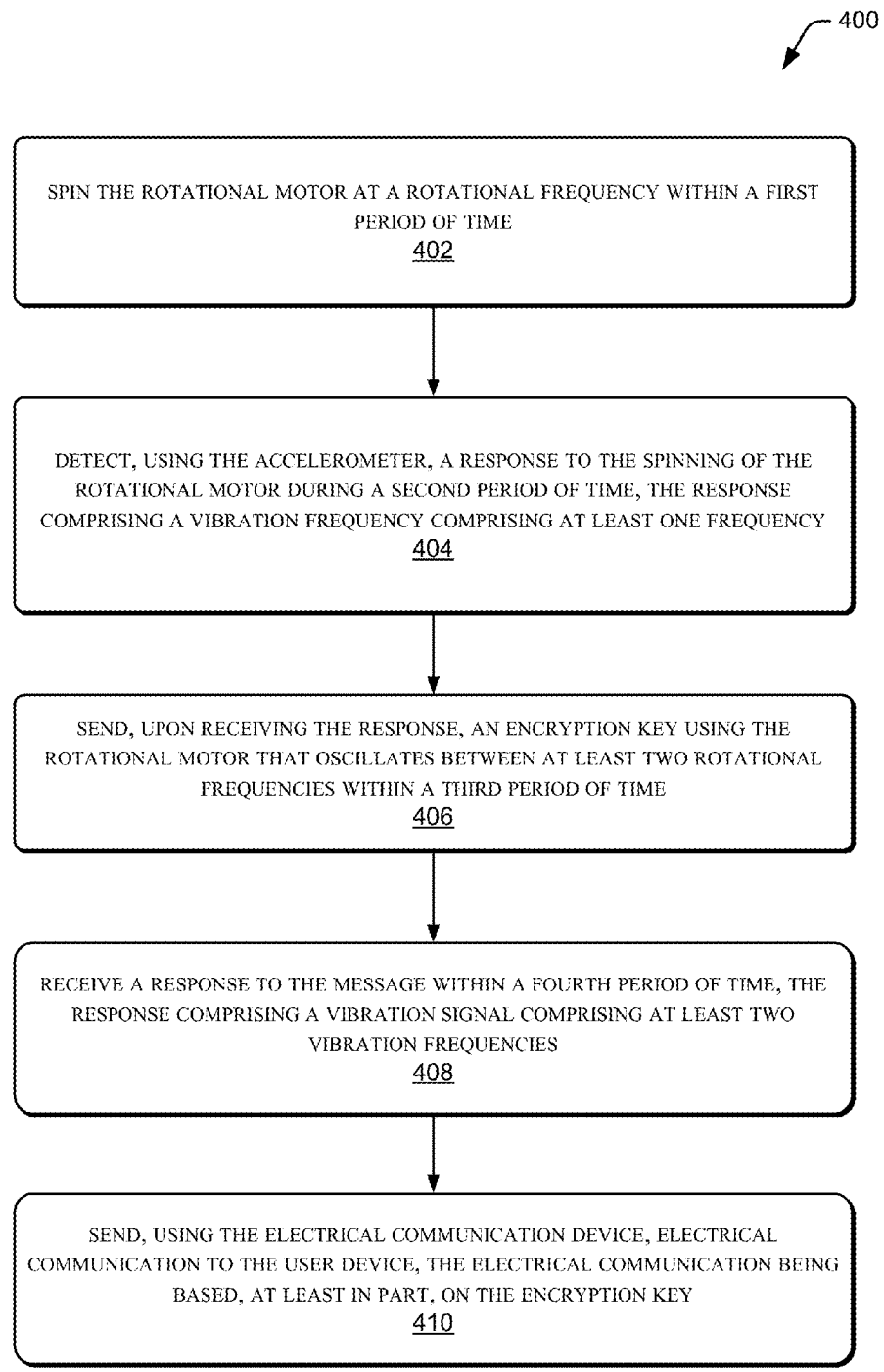
FIG. 4 illustrates a flow diagram for a method for initiating a vibration message exchange from a user device in accordance with one or more embodiments of the disclosure.

FIG. 4 illustrates a flow diagram for a method 400 for generating and detecting vibrations for communicating information between at least two user devices 102, 104. Method 400 illustrates one embodiment from the perspective of the user device(1) 102 generating and detecting vibrations to exchange information with the other user device(2) 104. As noted above, the user device(2) may use a vibration motor 214 to generate vibrations and an accelerometer 216 to detect vibrations. In this specific embodiment, the user device(1) 102 may send an encryption key to the other user device 102(2) 104. It should be noted that in other embodiments the sequencing of the method 400 may be altered and some operations may be omitted.

At block 402, the user device(1) 102 may spin the rotational motor (e.g., vibration motor 214) at one or more rotational frequencies within a first period of time (e.g., time window(1) 312). The vibrations may be generated by the rotational motor that may include an unbalanced object that is rotated by the rotational motor. The oscillation of the rotational frequencies may encode information in a binary format. For example, vibrating at 1000 Hz may represent a one within the binary format and no vibration may represent a zero within the binary format. In other embodiments, different frequencies (e.g., 1000 Hz, 2000 Hz) may represent zeros or ones within the binary encoding scheme (e.g., American Standard Code for Information Interchange (ACSII)).

At block 404, the user device (1) may detect a response to the spinning of the rotational motor. The detection may occur during a second period of time (e.g., time window(2) 314) when the user device(1) 102 may not be vibrating. The response may include a vibration arrangement comprising at least one frequency. For example, the vibration arrangement may include encoded information based, at least in part, on the vibration frequencies and the timing of the vibration frequencies: for instance, when the frequencies may oscillate between two different values and how fast the vibrations oscillate between the two different values.

At block 406, the user device(1) 102 may send a message using the rotational motor that oscillates between at least two rotational frequencies within a third period of time (e.g., time window(3) 316). In one embodiment, the message may include an encryption key that may be encoded within frequency oscillations using any binary technique (e.g., ASCII). The message may also include a request to use the encryption key to transfer information using an electrical communication system.

In another embodiment, the message may include payment information that may be used to purchase items at a store. The user device(1) 102 may be a phone and the other user device (2) 104 may be a point of sale device that processes payment information for banks and/or credit card companies.

In another embodiment, the message may include an internet protocol address and a password to access content associated with the internet protocol address. In another embodiment, the message may include a coupon for discounting a retail item. In another embodiment, the message may include a password or key for a wireless connection.

In another embodiment, the user device(1) 102 may send an internet protocol address or a web site address to direct another user to access the internet protocol address or website to receive additional information. The address information may also be accompanied by a username and/or password that may be used to access the web site.

At block 408, the user device(1) 102 may receive a response to the message within a fourth period of time (e.g., time window(4) 318). In one embodiment, the response may be in the form of a vibration signal including at least two vibration frequencies that form the basis of the encoded response. The response may acknowledge receipt of the encryption key and confirm the request to use the electrical communication system (and to use the encryption key to encrypt information sent over the electrical communication system).

At block 410, the user device(1) 102 may send or initiate an electrical communication to the other user device(2) 104. The electrical communication may be sent over wireless (w/ access point connectivity), wired, or peer-to-peer connections between the two user devices 102, 104. In this embodiment, the user device(1) 102 may encrypt the information sent over the electrical communication network using the encryption key that was sent to the other user device(2) 104.

Figure 5:
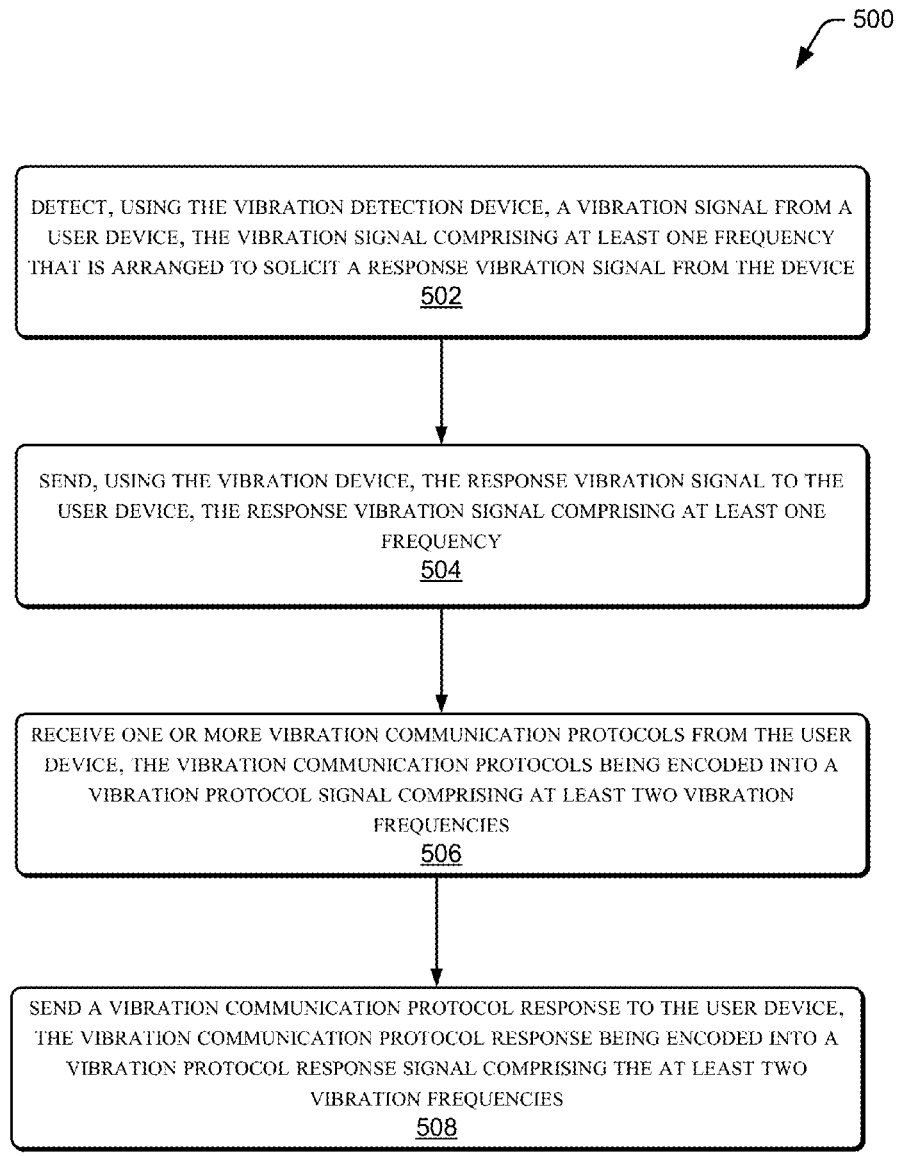
FIG. 5 illustrates a flow diagram for a method for responding to a vibration message from a user device in accordance with one or more embodiments of the disclosure.

FIG. 5 illustrates a flow diagram for a method 500 for generating and detecting vibrations for communicating information between at least two user devices 102, 104. Method 500 illustrates one embodiment from the perspective of the user device(2) 104 generating and detecting vibrations to exchange information with the other user device(1) 102. It should be noted that in other embodiments the sequencing of the method 500 may be altered and some operations may be omitted.

At block 502, the user device(2) 104 may detect the vibration signal being generated by the other user device(1) 102. The vibration signal may include at least one frequency that is arranged to solicit a response vibration signal from the user device(2) 104. The vibration signal may include using a single frequency that is periodically generated. In another embodiment, the vibration signal may comprise alternating between two or more frequencies in a repetitive manner. The vibration signal may pause for a period of time to listen for a response from another user device.

At block 504, the user device(2) 104 may send the response vibration signal to the user device(1) 102. The response vibration signal comprises at least one frequency or pattern of frequencies that indicate that the user device(2) 104 is ready to communicate by exchanging encoded vibration signals. The response vibration signal may be arranged in the same manner as the vibration signal described above in the description of block 502. In another embodiment, the response vibration signal may be the inverse of the vibration signal described in block 502.

At block 506, the user device(2) 104 may receive one or more vibration communication protocols from the other user device(1) 102. In this instance, the vibration communication protocols may be encoded into a vibration protocol signal comprising at least two vibration frequencies. For example, the encoding may be based, at least in part, on ASCII encoding or binary-coded decimal encoding.

In one embodiment, the communication protocols may include values for the at least two frequencies and an amount of time to shift between the at least two frequencies to encode information using the at least two frequencies. The communication protocol may also include capability information of the user device 102. For example, the communication protocols may include the capability of the user device to generate vibrations and the capability of the user device to detect vibrations. The capability of the device to generate vibrations is listed as a range of frequencies or a maximum frequency and a minimum frequency and the capability of the vibration detection device to detect vibrations is listed as a range of frequencies or a maximum frequency and a minimum frequency.

At block 508, the user device(2) 104 may send a vibration communication protocol response to the user(1) device 102. The vibration communication protocol response may be encoded into a vibration protocol response signal that is based, at least in part, on the at least two vibration frequencies. The communication protocol response may also include an acknowledgment of the vibration communication protocol.

In another embodiment, the method 500 may further include that the user device(2) 104 may receive an acknowledgement of the other communication protocol that is within the capability of the device and may receive a message that may include the at least two vibration frequencies that are within the capabilities of the vibration generation device and the vibration detection device.

Figure 6:
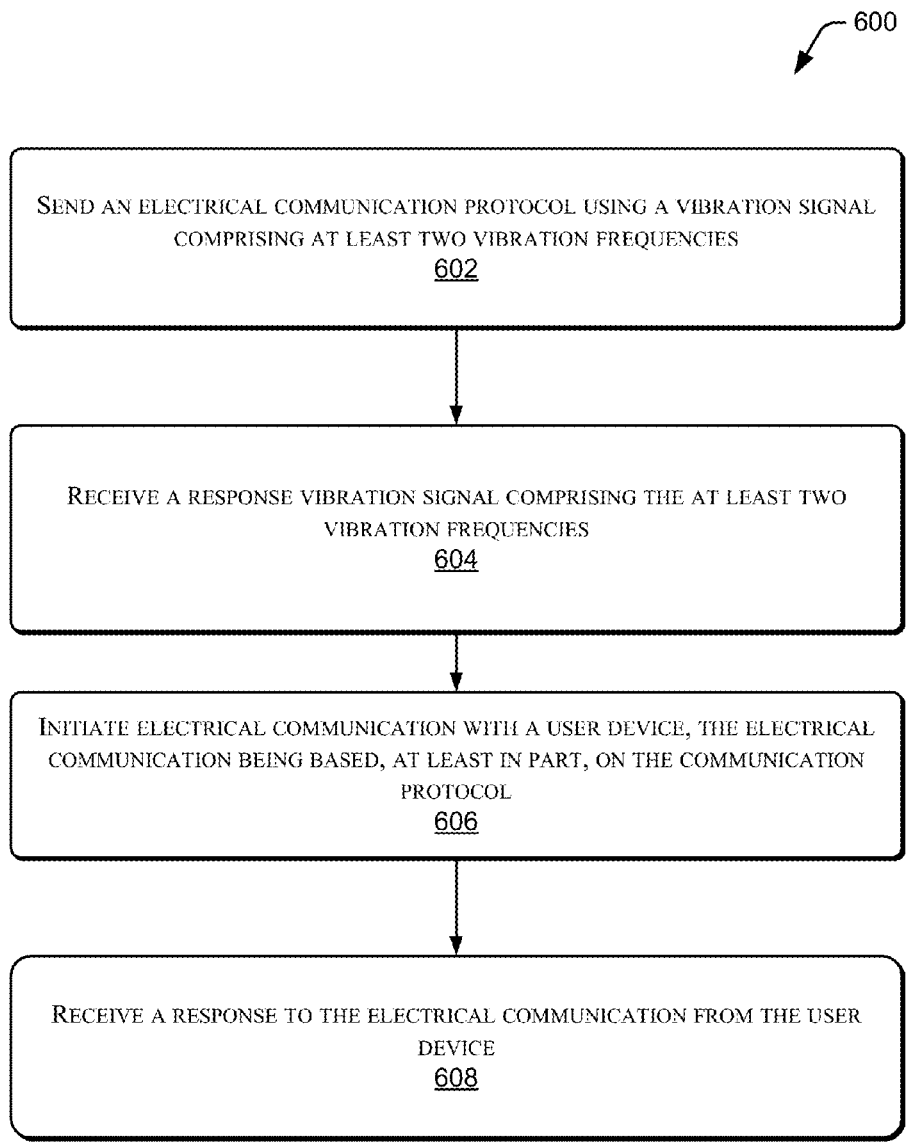
FIG. 6 illustrates a flow diagram for a method for exchanging electrical communication protocols using vibration signals in accordance with one or more embodiments of the disclosure.

FIG. 6 illustrates a flow diagram for a method 600 for sending and receiving messages encoded into the vibrations of a user device(1) 102. It should be noted that in other embodiments the sequencing of the flow diagram 600 may be altered and some operations may be omitted.

At block 602, the user device(1) 102 may send a message to the user device(2) 104 using the vibration device (e.g., vibration motor 214) to generate the message. The message may include an arrangement of the two vibration frequencies that encode information from the message. The encoding may be based on the ASCII standard or any other binary encoding standard. The message information may include a request to exchange information using an electrical communication system.

At block 604, the user device(1) 102 may receive a response message using the vibration detection device (e.g., accelerometer 216). The response message may include an arrangement of the at least two vibration frequencies to encode information in the response message. In one embodiment, the information may be an acknowledgement to use the electrical communication system. In some instances, the information may specify which type of communication system to use and when to use the electrical communication system.

At block 606, the user device(1) 102 may send an electrical communication message to the user device(2) 104. The electrical communication system may include, but is not limited to, a wireless network with access points, a wired network, or a peer-to-peer wireless network.

At block 608, the user device(1) 102 may receive a response acknowledging the receipt of the electrical communication. The user devices 102, 104 may continue to exchange information over the electrical communication system as needed.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   at least one rotational motor for generating vibrations at one or more frequencies;
   at least one accelerometer device for detecting vibrations;
   at least one electrical communication device to communicate with a user device;
   at least one memory for storing computer-executable instructions; and
   at least one processor configured to access the at least one rotational motor, the at least one accelerometer, and the at least one memory and execute the computer-executable instructions to:
   spin the rotational motor at one or more rotational frequencies within a first period of time, the arrangement of the one or more rotational frequencies encodes information in a binary format, wherein a first rotational frequency indicates a binary value of "1" and a second rotational frequency indicates a binary value of "0";
   detect, using the accelerometer, an indication of the capability of the user device to vibrate at a range of frequencies;
   detect, using the accelerometer, a response to the spinning of the rotational motor during a second period of time, and the response comprising a vibration arrangement comprising at least one frequency;
   send, upon receiving the response, a messaging comprising an encryption key using the rotational motor that oscillates between the first rotational frequency and the second rotational frequency within a third period of time;
   receive a response to the message within a fourth period of time, the response comprising a vibration signal comprising at least two vibration frequencies; and
   send, using the electrical communication device, electrical communication to the user device, the electrical communication being based, at least in part, on the encryption key.

2. The system of claim 1, wherein the first period of time, the second period of time, the third period of time, and the fourth period of time are in a sequential order.

3. A device, comprising:
   at least one electrical vibration device, for generating vibrations at one or more frequencies;
   at least one electrical vibration detection device;
   at least one memory for storing computer-executable instructions; and
   at least one processor configured to access the at least one electrical vibration device, the at least one electrical vibration detection device, and the at least one memory and execute the computer-executable instructions to:
   generate, using the electrical vibration device, at least one vibration comprising at least one frequency to encode information in a binary format, wherein the at least one frequency includes a first frequency indicating a first binary value and a second frequency indicating a second binary value;
   detect, using the electrical vibration detection device, an indication of the capability of the user device to vibrate at a range of frequencies;
   detect, using the electrical vibration detection device, at least one vibration from a user device, the at least one vibration comprising at least one frequency;
   send, using the electrical vibration device, a vibration signal comprising at least the first frequency and the second frequency; and
   receive a response to the vibration signal, the response comprising the at least two vibration frequencies.

4. The device of claim 3, wherein the vibration signal comprises a message and further comprising the computer-executable instructions to send, using an electrical communication device, electrical communication to the user device, the electrical communication being based, at least in part, on the message.

5. A device, comprising:
at least one electrical vibration device, for generating vibrations at one or more frequencies;
at least one electrical vibration detection device;
at least one memory for storing computer-executable instructions; and
at least one processor configured to access the at least one electrical vibration device, the at least one electrical vibration detection device, and the at least one memory and execute the computer-executable instructions to:
detect, using the electrical vibration detection device, a vibration signal from a user device, the vibration signal comprising at least one frequency that is arranged to solicit a response vibration signal from the device, wherein the at least one frequency includes a first frequency indicating a binary value of "1" and a second frequency indicating a binary value of "0";
detect, using electrical vibration detection device, an indication of the capability of the user device to vibrate at a range of frequencies;
send, using the electrical vibration device, the response vibration signal to the user device, the response vibration signal comprising at least one frequency;
receive one or more vibration communication protocols from the user device, the vibration communication protocols being encoded into a vibration protocol signal comprising at least two vibration frequencies; and
send a vibration communication protocol response to the user device, the vibration communication protocol response being encoded into a vibration protocol response signal comprising the at least two vibration frequencies.

6. The device of claim 5, wherein the communication protocols comprise values for the at least two frequencies and an amount of time to shift between the at least two frequencies to encode information using the at least two frequencies.

7. The device of claim 5, wherein the communication protocol response comprises an acknowledgment of the vibration communication protocol.

8. The device of claim 5, wherein the communication protocol comprises a capability of the device to generate vibrations and a capability of the device to detect vibrations.

9. The device of claim 8, wherein the capability of the device to generate vibrations comprising a range of frequencies or a maximum frequency and a minimum frequency.

10. The device of claim 8, wherein the capability of the electrical vibration detection device to detect vibrations comprises a range of frequencies or a maximum frequency and a minimum frequency.

11. The device of claim 10, the computer-executable instructions, further comprises instructions to:
receive an acknowledgement of the other communication protocol that is within the capability of the device; and
receive a message from the user device, the message comprising at least two vibration frequencies that are within the capabilities of the vibration generation device and the electrical vibration detection device.

12. A method comprising:
generating, using an electrical vibration device, at least one vibration comprising at least one frequency including a first frequency indicating a binary value of "1" and a second frequency indicating a binary value of "0";
detecting, using an electrical vibration detection device, an indication of the capability of a user device to vibrate at a range of frequencies;
detecting, using the electrical vibration detection device, at least one vibration from the user device, the at least one vibration comprising at least one frequency;
sending, using the electrical vibration device, a vibration signal comprising at least two frequencies; and
receiving, using the electrical vibration detection device, a response to the vibration signal, the response comprising the at least two vibration frequencies.

13. The method of claim 12, wherein the vibration signal comprises a message and the computer-executable instructions, further comprise instructions to send, using an electrical communication device, electrical communication to the user device, the electrical communication bring based, at least in part, on the message.

14. A Non-transitory computer-readable media storing computer-executable instructions that, when executed by at least one processor, configure the at least one processor to perform operations comprising:
detecting, using an electrical vibration detection device, a vibration signal from a user device, the vibration signal comprising at least one frequency for a first period of time and pauses for a second period of time, wherein the at least one frequency includes a first frequency indicating a binary value of "1" and a second frequency indicating a binary value of "0";
detecting, using the electrical vibration detection device, an indication of the capability of the user device to vibrate at a range of frequencies;
sending, using an electrical vibration device, a response vibration signal to the user device, the response vibrational signal comprising at least one frequency when the vibration signal pauses for the second period of time;
receiving a vibration communication request from the user device, the vibration communication request comprising at least two vibration frequencies; and
sending a vibration communication response to the user device, the vibration communication response comprising the at least two vibration frequencies.

15. A method comprising:
sending an electrical communication protocol using a vibration signal comprising at least two vibration frequencies;
receive a response to the vibration signal, the response comprising the at least two vibration frequencies;
initiate, using an electrical communication device, an electrical connection with a user device that sent the response, the electrical connection being based, at least in part, on the communication protocol; and
receive a response to the initiation of the electrical connection.

16. The method of claim 15, wherein the communication protocol comprises a password or key for a wireless connection.

17. A system, comprising:
at least one electrical communication device to communicate with a user device;
at least one vibration device for generating vibrations at one or more frequencies;
at least one vibration detection device;
at least one memory for storing computer-executable instructions; and at least one processor configured to access the at least one electrical communication device, the at least one vibration device, the at least one vibration detection device, and the at least one memory and execute the computer-executable instructions to:
send, using the at least one vibration device, a message to the user device, the message comprising an arrangement of two vibration frequencies to encode information from on the message, wherein the two vibration frequencies include a first frequency indicating a binary value of "1" and a second frequency indicating a binary value of "0";
detecting, using the at least one vibration detection device, an indication of the capability of the user device to vibrate at a range of vibration frequencies;
receive, using the at least one vibration detection device, a response message comprising an arrangement of the at least two vibration frequencies to encode an acknowledgement of receiving the information;
send, using the at least one electrical communication device, an electrical communication message to the user device, the electrical communication being, based at least in part, on the information; and
receive, using the at least one electrical communication device, a response acknowledging the receipt of the electrical communication.

* * * * *